United States Patent [19]
Day

[11] 3,930,462
[45] Jan. 6, 1976

[54] SLURRY DIP TANK

[75] Inventor: Edward G. Day, Rocky Hill, Conn.

[73] Assignee: United Technologies Corporation, Hartford, Conn.

[22] Filed: May 8, 1975

[21] Appl. No.: 575,754

[52] U.S. Cl. .................. 118/5; 118/7; 118/429; 118/612
[51] Int. Cl.² ............................................ B05C 3/04
[58] Field of Search ............ 118/5, 7, 612, 423–426, 118/429; 259/4; 134/154, 182, 183, 198

[56] References Cited
UNITED STATES PATENTS

| | | | |
|---|---|---|---|
| 1,861,142 | 5/1932 | Scherrer | 118/429 UX |
| 1,988,955 | 1/1935 | Nehmert | 118/429 X |
| 2,127,413 | 8/1938 | Leguillon | 118/429 X |
| 2,222,630 | 11/1940 | Pickford et al. | 118/429 X |
| 2,819,188 | 1/1958 | Metheny et al. | 118/429 X |
| 3,196,038 | 7/1965 | Schooch et al. | 118/63 X |
| 3,671,298 | 6/1972 | Maynard | 118/429 X |
| 3,892,197 | 7/1975 | Kinney et al. | 118/429 X |

*Primary Examiner*—Morris Kaplan
*Attorney, Agent, or Firm*—Anthony J. Criso

[57] ABSTRACT

An enclosure designed to maintain the purity and physical characteristics of a slurry within a preferred range during the manufacture of shell molds is disclosed. The tank is in the form of a trough with flat side walls and a curved member forming the front, bottom and back of the trough. The entire trough is water cooled and a cover along the top completes the enclosure. The enclosure is fitted with means for circulating the slurry and a liner having an airfoil member. Various sensing and control means are interconnected through a feedback system which continuously monitors and controls the conditions of the slurry.

11 Claims, 7 Drawing Figures

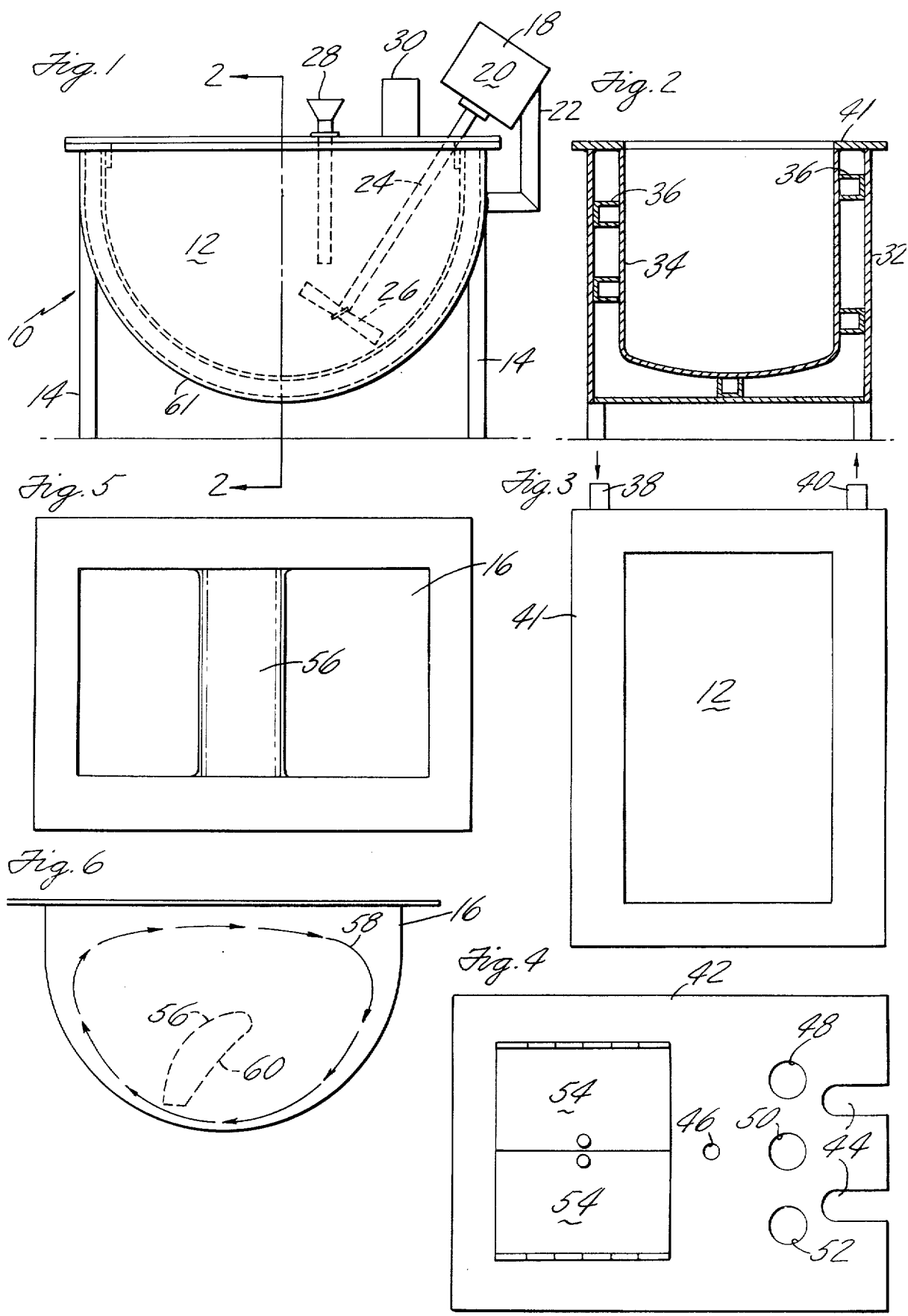

SLURRY DIP TANK

BACKGROUND OF THE INVENTION

1. Field of the Invention

The present invention relates to a tank assembly and more particularly to a slurry tank into which patterns are dipped in the formation of shell molds.

2. Description of the Prior Art

In the making of shell molds for investment castings, particularly by processes in which the shell consists of many layers formed by alternately dipping the pattern in a slurry and dusting with a granulate mixture, various characteristics and conditions of the slurry must be monitored to control the quality of the shell. For example, the slurry must be mixed continuously to prevent its heavier elements from settling. The typical dip tank in present foundry service is essentially an open drum mounted on a vertical shaft which is rotatable. A scraper paddle is positioned internal of the drum adjacent to the vertical wall and extends along the bottom of the drum. As the drum is rotated, the paddle provides continual mixing of the contained material and also avoids the buildup of an excessively thick layer along either the wall or bottom of the drum. As a practical matter, the consistency of a slurry maintained in such a device is not always as uniform as desired. Another consideration affecting control of the quality of molds made with such equipment is the buildup of slurry on the inside surfaces of the rotating drum. Slurry material adheres to the drum and forms a coating having a thickness equal to the clearance between the scraper bar and the drum. Any additional buildup is removed from the coating by the scraper paddle by the mixing action producing hardened particles which find their way into the final shell mold thereby weakening the mold and causing imperfections on the surface of the casting.

Another significant consideration in the quality control of shell molds is the viscosity of the slurry. If the viscosity is allowed to deviate from a predetermined range of values, the thickness of the shell mold formed in each dip process can become either too thick or too thin. At present, the viscosity is measured with a manual technique using a Zaun cup in which an operator fills the cup with the slurry mixture to be tested and observes the time required for the Zaun cup to empty. This time is correlated to viscosity. The technique is subject to human judgment and can be inaccurate.

Control of the temperature of the slurry throughout the dipping process is also important. The temperature of the slurry itself is usually not critical, however, the temperature to which the pattern is exposed can be very critical. If the temperature of a wax pattern is allowed to vary to any substantial extent, the dimensional control of the cast item can be compromised. Thus, by maintaining the temperature of the slurry within a prescribed range this source of dimensional error can be eliminated.

Another significant variable in the slurry composition is density. In a slurry dip operation using rotating drum apparatus, the slurry density is typically controlled manually with the Zaun cup apparatus mentioned previously; both viscosity and density can be measured simultaneously. One of the principal shortcomings of this technique is the inaccuracy in the observed readings which require a human operator. In some processes such as the preparation of shell molds for fine investment castings, density control by Zaun cup measurement is not sufficiently accurate. Also since this control is done manually, the tendency is to take sample readings at rather lengthy intervals and adverse changes in the density characteristic can occur during such intervals, resulting in poor quality molds. The effect on a mold made from a slurry having an improper density can be considerable. For example, since the smaller mesh particulate in a slurry tends to be consumed before the large mesh material, the density of the slurry tends to increase with usage. This type of change can be adverse to the surface quality of the cast part. Also, an increase in the average mesh size of the particles forming the slurry has been found to decrease the strength of the mold.

SUMMARY OF THE INVENTION

A primary object of the present invention is to improve the quality of shell molds made with dipping techniques in a tank assembly which thoroughly mixes a slurry and accommodates automated sampling, testing and compositional regulation of the slurry as well as recording of data from the testing.

According to the present invention a tank assembly is formed with a tank having a curved internal contour, a tank liner having a shape matched to the internal contour of the tank and including an airfoil shape extending across the width of the tank and means for circulating a flowable substance around the airfoil shape. In some embodiments the assembly includes automatic sensing and control means to monitor and adjust the physical characteristics of the substance contained in the liner.

A feature of the tank assembly is the shape of the tank component which in side elevation has a generally semicircular cross section. The assembly also includes a tank liner of resilient material and having an airfoil member to control the flow of slurry within the tank; a plurality of mixing impellers forces the slurry to flow in a circulating pattern around the airfoil. The impellers are mounted on a shaft and rotated at a suitable speed from outside the tank with a stationary sleeve surrounding the shaft in the vicinity of the slurry surface level. The side walls of the tank are cooled and a temperature responsive feedback circuit control regulates the coolant flow rate. The viscosity of the slurry is monitored and a feedback control circuit regulates a water feed source which is sprayed into the tank as required. A fill pipe extending to below the surface of the liquid level in the tank allows additional slurry material to be added just adjacent to the impellers to assure immediate mixing and preclude the entrapment of air during filling. The tank includes manometer type gauges and level alarms. For the time period during which a pattern is being dipped into the slurry, the stirring is stopped and the sampling measurements are taken.

Some of the primary advantages of the present invention include the close control of the temperature, viscosity and density of the slurry throughout its period of residence in the tank. The operation of the tank can be completely automated and shell molds can be produced at a relatively high rate with a relatively low probability of rejection. The tank liner reduces wear and minimizes the cleanup procedures normally associated with the operation of a slurry tank. The rate of evaporation of moisture from the slurry is substantially reduced and when additional water is required, the injection is performed without manual intervention. Sensing of various critical parameters describing the condition of the slurry is automated thereby avoiding manual intervention while increasing the reliability and accuracy of such sensing; automation also permits remote storage or display of this data. The shape of the tank and the positioning of the various auxiliary equipment introduces very little disturbance on the surface of the slurry and results in a substantial reduction in the amount of entrained air in the slurry. The liner contour and the airfoil shape are combined to reduce the formation of settlement in all regions in the tank, increase the life of the tank, and as long as the stirring agitation of the slurry is not discontinued for any significant length of time, to prevent adhesion of the slurry to the liner. The invention is able to accommodate slurries of various compositions so that the circulation through the tank always covers substantially the entire wetted surface internal of the liner. The particular dipping conditions which exist throughout the shell mold dipping process can be recorded and the dipping history of the mold reconstructed if necessary. The pattern is exposed to slurries having a much better control temperature variation than was possible previously, a consideration especially significant for wax patterns. The system responds to excursions of any of the parameters being monitored instantaneously thereby avoiding sustained dip operations under undesired conditions.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a simplified sketch showing the general contour of the main elements forming a dip tank assembly in accordance with the present invention;

FIG. 2 is a cross sectional view through the tank along the line 2—2 of FIG. 1;

FIG. 3 is a simplified sketch of the top of the tank;

FIG. 4 is a simplified sketch of the tank cover;

FIG. 5 is a simplified top view of the tank liner;

FIG. 6 is a simplified sketch showing the side contour of the tank liner; and

DESCRIPTION OF A PREFERRED EMBODIMENT

Figure 7:
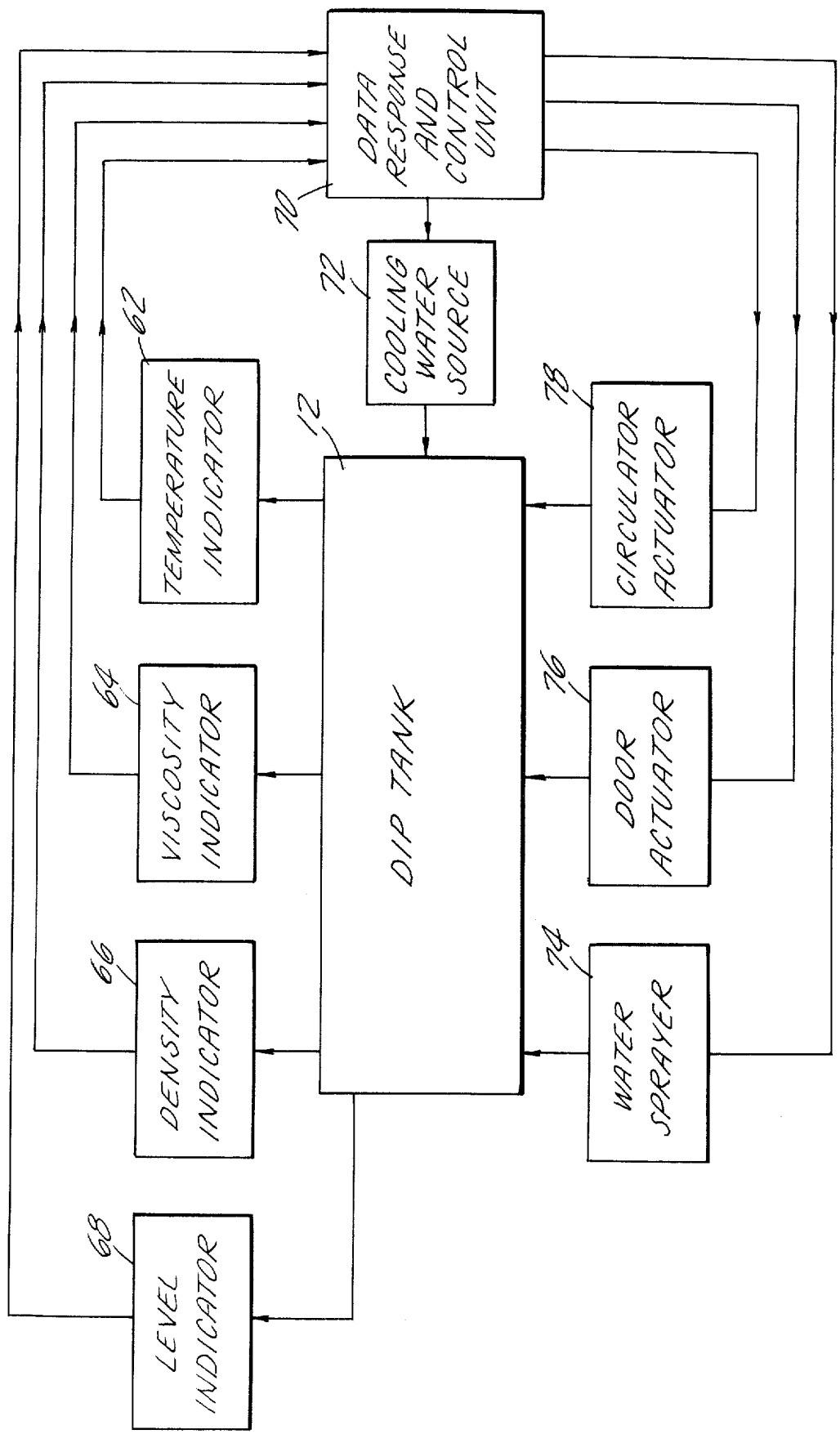
FIG. 7 is an overall schematic showing the dip tank with the principal sensing and control elements.

A main tank assembly 10 is shown in a simplified sketch in FIG. 1. The assembly includes a tank 12 which is held off the floor by end supports 14, a tank liner 16 as shown in FIGS. 5 and 6 which fits inside the tank and is described in greater detail hereinafter and a circulator 18 which includes a drive motor 20 cantilevered from the back of the tank assembly by an arm support 22, a drive shaft 24 and an impeller 26. The tank assembly also includes a fill tube 28 and an instrumentation package 30.

FIG. 2 is a simplified cross sectional view through the tank or trough along the line 2—2. The trough is of double wall construction having an outer wall 32 and an inner wall 34, the inner and outer walls being joined by strong back members 36 which serve as stiffeners. The space between the inner and outer walls forms a water jacket around the entire trough. FIG. 3 is a simplified top view of the trough showing water inlet means 38, water outlet means 40, and a horizontal lip 41 which extends around the full circumference. A cover 42 which is shown in simplified form in FIG. 4 extends horizontally across the top of the trough. The back edge of the cover contains two cutouts 44 which allow drive shafts to penetrate the cover. In addition, a fill tube hole 46, a viscosity indicator hole 48, a level and density indicator hole 50 and a temperature indicator hole 52 penetrate the cover. A pair of doors 54 hinged along the side of the cover allow access to the trough when the cover is in place.

The tank liner 16 which is shown in a simplified top view in FIG. 5 and in side elevation in FIG. 6 includes an airfoil member 56 which extends across the width of the liner. The liner is formed of a resilient material such as polyethylene and the use of such a liner effectively extends the life of the tank assembly indefinitely. The thickness of the liner is sufficient so that its resiliency allows the liner to yield under the impact of the particulate material in the slurry which is being circulated. This resilience allows the liner to accept the impact of the slurry without the sharp edges of the particulate matter penetrating into the surface of the liner thereby essentially eliminating all wear in the tank due to abrasions by the slurry. A concomitant effect which is no less important is the elimination of contamination in the slurry by the foreign grit which would otherwise be warn off the tank. Also, since the liner is readily separable from the trough, it can be removed to facilitate rapid and thorough cleaning of the trough. The liner has a tendency to collapse on itself when in place in the tank even when it is filled with slurry. This problem is corrected by various means such as fixedly attaching the liner to the side walls of the trough by mechanical means or providing bracket extensions from the cover extending downwardly into the trough to hold the liner between the brackets and the side walls.

A slurry must be constantly circulated throughout its useful life when pattern assemblies are being dipped to form shell molds. Circulation is maintained in the present invention by the circulator 18 which pushes the slurry along a flow path 58 in the liner. This path results from the interaction of the pumping action of the circulator, the overall contour of the trough, and the presence of the airfoil member 56. The airfoil member extends across the entire width of the trough and presents a flat surface 60 to the upper tip of the impeller 26. The trough has essentially a flat vertical side, as shown in FIG. 2, and a curved surface 61 which extends from the top front of the tank to the bottom center and then to the top rear of the tank as shown in FIG. 1. The profile of this curved surface is often semicircular.

The cover 42 is shown in FIG. 4 with four circular holes, two elongated cutouts and two doors. This cover rests on the horizontal lip 41 of the tank and allows the slurry in the tank to be completely enclosed. The enclosure function of the cover contributes significantly to the quality control of the shell molds made from slurry kept in the tank for several reasons. The cover is kept in place with the doors closed except when a pattern is actually being dipped into the slurry thereby substantially reducing air-slurry interaction. Also, the cover minimizes contamination of the slurry by bacteria in the air and other foreign materials which might otherwise enter the slurry if it were not enclosed. The cover also reduces the evaporation of moisture from the slurry during circulation through the tank. The fill tube hole 46 accommodates the fill tube 28 which extends from above the cover to a location which is below the normal slurry level in the tank and just above the impellers. This permits the addition of slurry to the tank without introducing air or other foreign matter to the slurry at a point where the newly added slurry can be uniformly distributed through the slurry already present in the tank. The viscosity, level density and temperature indicator holes accommodate various suitable instrumentation which extends into the slurry and provides suitable data with respect to viscosity, level, density and temperature of the slurry. Each of the cutouts 44 allows a drive shaft 24 to pass through the cover and into the slurry. When the circulator is operative there is a tendency for the slurry to whirlpool on the surface in the vicinity of the drive shaft and draw in air. Thus, a boot is fitted around each shaft, extending from below the slurry level in the tank up through the cutout in the cover and closes off another possible entry point for air.

The water jacket which covers both sides of the tank as well as the curved surface 61 is provided with inlet and outlet means which permit a continuous flow of water through the jacket. Various baffle plates are located within the water jacket to cause the water to flow over the entire surface of the inner wall 34. The cooling water can be supplied from any convenient source and is typically at approximately fifty degrees Farenheit. The jacket is maintained under a positive pressure with suitable valving and the water flow through the jacket is sufficient to keep the slurry in one embodiment at approximately seventy-five degrees with essentially no temperature variation throughout the slurry in the tank.

In one preferred embodiment of the present invention, two impellers are engaged on each of two separate drive shafts to provide the required driving force to the slurry. The impellers essentially fill the entire area between the flat surface 60 of the airfoil member and the surface 61. The rotation of these drive shafts is carefully controlled with respect to both direction and speed of rotation to accommodate the rotational requirements of the impellers. Also, the drive motor 20 is capable of rotating over a range of speeds in order to provide the required circulating forces as alternate slurry compositions with various density characteristics are used.

The tank assembly described above can be operated in a semiautomatic or automatic mode. A sketch of the tank assembly and many of the interacting components is shown schematically in FIG. 7. The tank 12 is fitted with a temperature indicator 62, a viscosity indicator 64, a density indicator 66 and a level indicator 68, each of which senses the slurry in the tank and provides a corresponding signal to a data response and control unit 70 which is frequently set up to produce continuous printouts of data on the density, temperature, viscosity and level of slurry in the tank. The control unit in turn operates a cooling water source 72 such that a coolant is passed through the water jacket at a sufficient rate to maintain the temperature of the slurry in the tank within a preselected range which is provided as a reference in the control system. In a similar manner, the viscosity indicator provides data describing the viscosity of the slurry in the tank to the control system. Should the viscosity go below a preselected range built into the control unit, a signal is sent to a water sprayer 74 which injects a dose of water into the slurry where it is quickly distributed throughout the slurry by the circulating action in the slurry. The density and level indicators provide suitable signals to the control unit and if the density of the slurry becomes too high or the level in the tank becomes either too high or too low, the control unit sets off an alarm such that corrective action may be taken. In automated operation of the system the control unit is programmed to energize a door activator 76 which opens the doors 54 in the cover to allow a pattern to be dipped in the slurry. The pattern is raised above the slurry level and allowed to drip momentarily and then removed from the area while the doors are closed. Coordinated with the door actuation is a signal to the circulator 18. The slurry is a relatively heavy material containing dense particulate matter which tends to quickly precipitate to the bottom of the slurry unless the slurry is constantly agitated. Thus, the circulator is energized almost constantly although during the dipping operation it is preferred that the motion of the slurry be minimized. Therefore, the circulator is deactivated for short periods while a pattern is dipped in the slurry.

Although this invention has been shown and described with respect to preferred embodiments thereof, it should be understood by those skilled in the art that various changes and omissions in the form and detail thereof may be made without departing from the spirit and the scope of the invention.

Having thus described a typical embodiment of my invention, that which I claim as new and desire to secure by Letters Patent of the United States is:

1. A tank assembly for maintaining a slurry used in the formation of a shell mold over a pattern comprising:
   a tank;
   a removable, resilient liner which conforms to the general internal contour of the tank and fits into the tank;
   pump means which extend into the tank for circulating slurry contained by the liner; and
   said liner including a wing type airfoil member extending across the liner, at an intermediate vertical position thereof and spaced from the bottom, whereby to enhance said circulation.

2. The invention according to claim 1 wherein the tank is in the shape of a trough comprising a first and a second flat vertical side and a curved member which extends between the sides along its entire length from the front to the back of the trough.

3. The invention according to claim 2 including further a cover which fits across the top of the trough.

4. The invention according to claim 2 wherein the side profile of the curved member is an arc of constant radius.

5. The invention according to claim 1 including further means for cooling the trough.

6. The invention according to claim 5 including further means for injecting water into the slurry.

7. The invention according to claim 6 including further means for sensing the temperature of slurry in the trough and providing a slurry temperature signal.

8. The invention according to claim 6 including further means for sensing the density of the slurry in the trough and providing a slurry density signal.

9. The invention according to claim 6 including further means for sensing the viscosity of the slurry in the trough and providing a slurry viscosity signal.

10. The invention according to claim 6 including further means for sensing the level of the slurry in the trough and providing a slurry level signal.

11. The invention according to claim 1 including further a data response and control unit adapted to receive at least one signal from temperature, density, viscosity and level sensing means associated with said tank and slurry, to compare said at least one signal with a preselected range of values and, responsive to a signal of said comparater, to actuate a control means for maintaining said slurry control signals.

* * * * *